United States Patent [19]

Bates

[11] 4,158,428

[45] Jun. 19, 1979

[54] DROP ON LIFT OFF BASKET ASSEMBLY FOR A WHEELCHAIR

[76] Inventor: Clarence W. Bates, 353 Palmetto La., Golden Meadow, La. 70357

[21] Appl. No.: 907,232

[22] Filed: May 18, 1978

[51] Int. Cl.[2] .............................................. B60R 11/00

[52] U.S. Cl. ...................... 224/42.42 A; 280/289 WC; 297/DIG. 4; 297/148

[58] Field of Search .................. 224/42.42 R, 42.42 A, 224/42.43, 42.45 R, 42.45 B, 42.46 R, 42.46 B, 29 R, 29 D; 297/DIG. 4, 148, 149, 150, 153; 280/289 WC, 289 R, 202, 727

[56] References Cited

U.S. PATENT DOCUMENTS

| | | | |
|---|---|---|---|
| 2,498,736 | 2/1950 | Freund | 297/149 X |
| 2,679,283 | 5/1954 | Mahone | 297/DIG. 4 |
| 3,061,394 | 10/1962 | Whetstone | 224/42.42 R UX |
| 3,333,751 | 8/1967 | Brown | 224/42.42 R |

FOREIGN PATENT DOCUMENTS

| | | | |
|---|---|---|---|
| 18772 | 9/1908 | United Kingdom | 297/153 |

*Primary Examiner*—David A. Scherbel
*Assistant Examiner*—Jerold M. Forsberg
*Attorney, Agent, or Firm*—James B. Lake, Jr.

[57] ABSTRACT

A generally rectangular basket, having a two-level bottom with lower level forward, is supported on a wheelchair, having horizontal foot and arm rests vertically spaced apart. Vertical legs are adjustably fixed to the forward and lower bottomed end of the basket to extend downward therefrom and engage the horizontal foot rest. Horizontal arms are adjustably fixed to opposite sides of the basket and extend rearward and over the wheelchair arm rests, the adjustable arms being recessed to fit over and around the wheelchair arms. The basket is thus displaceable only by a lifting force. The depending lower bottom increases carrying space without interfering with the line of sight of an occupant, and also without decreasing the stability of the wheelchair. A lift-off cover for the basket also acts as a horizontal support for things necessary to the limited activities of the wheelchair occupant, while the basket itself is lightened by a multiplicity of perforations for easy attachment and removable by the occupant without help.

3 Claims, 3 Drawing Figures

DROP ON LIFT OFF BASKET ASSEMBLY FOR A WHEELCHAIR

BACKGROUND OF THE INVENTION

The invention relates generally to baskets, and more particularly to a basket assembly that is removably mountable on a wheelchair by an occupant.

A search of the prior art reveals U.S. Pat. No. 4,054,315 to Czarnowski for a Table Assembly for a Wheelchair, U.S. Pat. No. 3,044,801 to Vicany for an Occupant Propelled Shopping Cart, and U.S. Pat. No. 2,745,465 to Hogan for an Invalid Walker. None teach or anticipate the invention, and none makes the invention obvious, unless the table assembly of Czarnowski makes obvious anything else mounted on a wheelchair by whatever different and more suitable means.

SUMMARY OF THE INVENTION

An object of the invention is to provide a basket assembly for general and shopping use of a person confined to but capable of getting about in a wheelchair.

Another object of the invention is to provide a basket assembly removably installable by such a person without help and tools.

Another object of the invention is to provide a basket assembly proportioned and supportable by a wheelchair with no decrease in stability thereof and in the line of sight of an occupant, and with no increase in the overall dimensional limits of the wheelchair.

DETAILED DESCRIPTION

Figure 1:
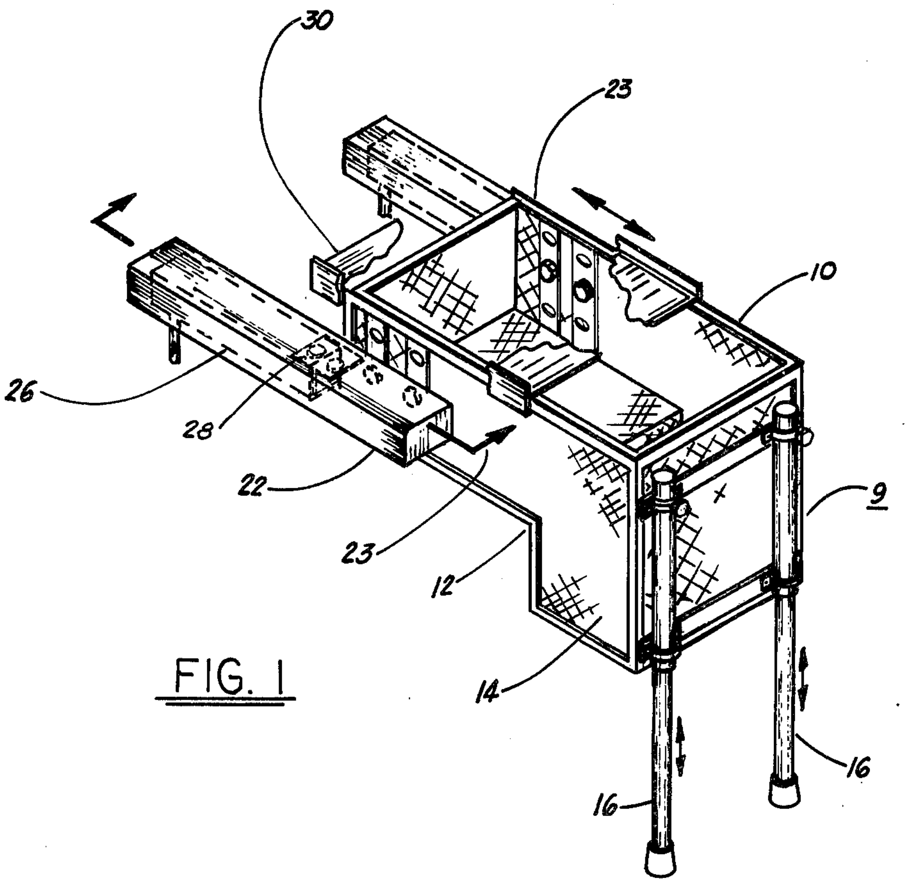
FIG. 1 is a three dimensial view of the invention from the upper left.
Figure 3:
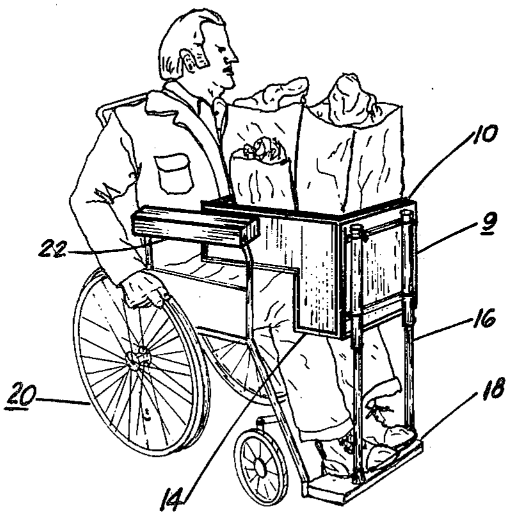
FIG. 3 is a reduced three dimensional view of the invention mounted on a wheelchair and in use.
Figure 2:
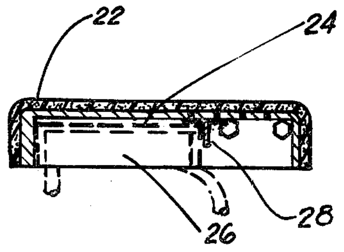
FIG. 2 is an enlarged cross-sectional view along section lines 2—2 of FIG. 3.

Referring to the drawings, the invention, basket assembly 9, comprises a basket 10, rectangular and open as viewed from above, and level on top with a closed two-step bottom 12 defining a depending forward part 14. A pair of telescoping legs 16 are spaced transversely apart and secured to a forward end of basket 10 to vertically extend below depending part 14, and when extended to contact a horizontal foot rest 18 of a wheelchair 20. Arms 22 are secured, respectively adjustable horizontally, to opposite sides 23 of basket 10 to extend rearward over arm rests 24 of wheelchair 20. Arms 22 define recesses or hollows 26 that respectively fit over and enclosed, on three sides, arm rests 24 when the basket is lowered thereover to simultaneously contact foot rest 18 with the ends of legs 16 extended. The engaging arms 22 and arm rests 24 hold the basket assembly 9 in transverse alignment with the wheelchair, and with the legs 16 engagement with foot rest 18, in horizontal alignment therewith.

The basket sides 23 and bottom 12 define a multiplicity of perforations 28 for lightening the basket 10, and a flat cover 30 is provided for slidably engaging over the basket top for additional use therewith as table or desk.

In use, an occupant of the wheelchair can easily lift basket assembly 9, extend the telescoping legs 16, and drop-on the wheelchair, open top up, with arms 22 and legs 16 in engagement with wheelchair parts as heretofore described. Conversely an occupant can easily lift the basket assembly clear of the wheelchair, telescope the legs and lay aside. The two-step bottom 12 and depending part 14 provide additional storage space with no discomfort to a user, no interference with user's line of vision, no increase in dimensions of the wheelchair, and no decrease in stability of the wheelchair. Full and easy maneuverability of the wheelchair is retained by the combination, and the independence of a handicapped person is improved.

What is claimed is:

1. A drop-in lift-off basket assembly for a wheelchair, having foot and arm rests, and comprising in combination:

(a) rectangular and open-topped basket means, having a two-step closed bottom that depends forwardly;

(b) telescoping legs mounted on the forward and depending end of said basket means, said legs being extendable vertically downward to engage said foot rest; and (c) bottom-recessed arm rests respectively mounted on the oppositely disposed sides of said basket means and intermediate the top and bottoms thereof to extend rearward therebeyond, and being adapted to engage in said bottom recesses said wheelchair arm rests, and in cooperation with said legs, support said basket means horizontally on said wheelchair against transverse and downward forces.

2. A drop-on lift-off basket assembly as described in claim 1, wherein the two-step bottom of said basket means conforms to the bent knees of a seated wheelchair occupant and extends the storage capacity of said basket means without decreasing stability of the wheelchair and without increasing overall fore and aft dimensions.

3. A drop-on lift-off basket assembly as described in claim 1 wherein a flat cover slidably engages the side edges of the open top for use as a desk.

* * * * *